United States Patent [19]
Rauschenberger

[11] Patent Number: 5,890,561
[45] Date of Patent: Apr. 6, 1999

[54] CONNECTION BETWEEN A LADDER SIDE RAIL AND A HINGED ARM OF A LADDER HINGE

[76] Inventor: Jörg Rauschenberger, Königsstrasse 61, 71679 Asperg, Germany

[21] Appl. No.: 764,907

[22] Filed: Dec. 16, 1996

[51] Int. Cl.$^6$ .................................................. F16C 11/00
[52] U.S. Cl. ............................................................. 182/163
[58] Field of Search ........................... 182/163; 403/93, 403/24, 300, 305, 274, 282; 29/515, 516, 522.1, 521

[56] References Cited

U.S. PATENT DOCUMENTS

| | | | |
|---|---|---|---|
| 511,744 | 1/1894 | Andrew . | |
| 4,666,327 | 5/1987 | Su | 182/163 |
| 4,842,098 | 6/1989 | Yuen | 182/163 |
| 4,928,792 | 5/1990 | Krause | 182/163 |

FOREIGN PATENT DOCUMENTS 4344921  12/1993  Germany .

Primary Examiner—Alvin Chin-Shue
Attorney, Agent, or Firm—Horst M. Kasper

[57] ABSTRACT

The connection between the ladder side rail (3) and the hinge arm (2) is performed through a form-matching and/or force-matching joining connection ($F_N$, $F_V$) in the corner regions (5, 6) of the profile of the hinge arms (2) and of the ladder side rails (3) and/or in their profile sides (2.2, 3.2), which are disposed substantially parallel to the hinge axis (AG). An optimum force transfer from the ladder side rail (3) to the hinged arm (2) is assured based on the novel arrangement of the joining connection ($F_N$) and ($F_V$). A deformation of the ends of the ladder side rail (3), which ends are connected to the hinged arms (2), is nearly excluded. A simple, economic, and at the same time reliable connection is created in particular by the production of the joining connection ($F_V$) with a suitable deformation method.

11 Claims, 5 Drawing Sheets

1

CONNECTION BETWEEN A LADDER SIDE RAIL AND A HINGED ARM OF A LADDER HINGE

BACKGROUND OF THE INVENTION

1. Field of the Invention

The invention relates to a connection between a ladder side rail and a hinged arm of a ladder hinge.

2. Brief Description of the Background of the Invention Including Prior Art

Presently the connection between the ladder side rails and the two hinged arms of the ladder hinge is produced nearly exclusively through rivet connections. Either rivets passing through or blind rivets are employed in this situation, wherein the rivets are exclusively entered at the longer sides of the profiles, which profiles are disposed perpendicular to the hinge axis and perpendicular to the force engagement of case of a load. It is a disadvantage in connection with the rivet connections that they exhibit a relatively small supporting face and a play between the rivets and the boreholes, whereby a one-sided resting of the rivet at the borehole results in case of a load, and where a deformation of the borehole can occur based on the rounding of the borehole. In order to assure the required safety, relatively many rivet connections are required. A method and a device for the connection of at least two construction parts is described in the German printed patent document DE 43 44 921 A1, which method and device amongst others can be applied also to the generation of a connection between a ladder side rail and a hinge arm of a ladder hinge. Boreholes are entered in the hinged arm and in the ladder side rail, wherein the material of an addition profile element is entered in the boreholes with the aid of a bolt, wherein the bolt remains in the ladder side rail. In this case also the joining connection is entered at the sides of the profile, which are disposed perpendicular to the hinge axis and to the force engagement.

The hinge arms and the ladder side rails have to overlap over a relatively large region according to the known kinds of connection. Furthermore, in case of an overload, which can occur by a lever action between the ladder side rail and the hinged arm, there can occur an undesired deformation at the end of the ladder side rail. In this case, the ladder side rail expands at the narrow side, where the hinged arm is pressed against said narrow side in case of a load.

SUMMARY OF THE INVENTION

1. Purposes of the Invention

It is an object of the present invention to provide an economic and reliable connection between the ladder side rail and the respective hinge arm of the ladder hinge by way of which the overlapping length between the ladder side rail and the hinged arm can be made short and small, and wherein the undesired deformations at the end of the ladder side rails are decreased or, respectively, excluded in case of a load.

These and other objects and advantages of the present invention will become evident from the description which follows.

2. Brief Description of the Invention

The present invention provides a connection of a ladder side rail to a ladder hinge. A hinged arm and a ladder side rail overlap in a predetermined region. Matching joining connections are disposed in a predetermined region and connect a profile of the hinged arm and a profile of the ladder side rail in an area of respective sides of the ladder side rail and of the hinged arm. The respective sides of the ladder side rail and of the hinged arm are substantially disposed parallel to the axis of the ladder hinge.

The matching joining connections can form-matchingly and/or force-matchingly connect the profile of the hinged arm and the profile of the ladder side rail.

The profile of the hinged arm and the profile of the ladder side rail can exhibit a rectangular cross-section. The connection between the hinged arm and the ladder side rail can be furnished at edges of the respective profiles. The edges can correspond to the corners of the rectangular cross-section.

The connections between the hinged arm and the ladder side rail can be substantially disposed on respective sides, where a plane of the side contains a spanning line substantially disposed parallel to the axis of the ladder hinge.

The hinged arm can be furnished with openings. Formed material of the ladder side rail can be entered in the openings in the hinged arm. The joining connections can be formed as connections produced by deformation.

The openings, provided in the hinged arm, and the joining connection, generated by deformation, can exhibit in a top planar view a shape exhibiting substantially an axial symmetry, a substantially circular shape, and a substantially rectangular shape.

At least one joining connection, produced by deformation, can be disposed in each corner region of the profile of the hinged arm and of the ladder side rail.

The joining connection can be formed in each case of a type of the group selected from a stamping, a tapered connection, a rail head connection, a crimp connection, a bending joining connection, and an interstratified joining connection.

A plurality of joining connections can be disposed in series in a longitudinal direction of the ladder side rail.

The hinged arm can be employed in the shape of a lamella. An H-shaped incision can be furnished in the lamella of the hinged arm. Flaps, formed by the incision, can be bent in a direction toward an oppositely disposed side of the ladder side rail such that the flaps rest with their outer edges in corners of the ladder side rail. Openings can be provided in the flaps at edges, which edges can be disposed in the corners of the ladder side rail, and at the corner regions of the lamella. Said openings can receive the material of the hinge arm.

The basic idea of the invention is to avoid the up to now conventional joining connections in the profile sides of the hinged arms and of the ladder side rails, which are disposed perpendicular to the hinge axis and which are disposed in the plane of the force engagement.

The joining connections according to the invention are disposed for the first time in the corner regions of the profiles of the ladder side rails and of the hinged arms, and/or in the profile sides, which are disposed parallel to the hinge axis and perpendicular to the force engagement.

The joining connections can in this case be produced by rivets just as they are in conventional structures. However, based on corresponding deformation methods, the possibility also exists to enter the material of the ladder side rail into corresponding openings or recesses of the hinged arm and to produce thus a form-matching and force-matching connection. Several connections can be disposed in series in the region of the overlap of the ladder side rail and the hinged arm in the longitudinal direction of the ladder side rail according to an advantageous embodiment. The joining connections are furnished preferably at least at two oppositely disposed positions and are distributed over the circumference of the profiles of the ladder side rail and the hinged arm. Advantageously, joining connections are produced at four positions. The joining connections can be disposed either in corner regions of the ladder profile or in each case in pairs on the short profile sides, which are disposed parallel to the hinge axis.

Based on the arrangement of the joining connections according to the invention at the narrow sides of the profile and parallel to the hinge axis or in the corner points of the profile, the length of the overlap between the ladder side rail and the hinged arm can be reduced. The advantage of this connection at the corner positions enables a simpler stamping method.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1b is a sectional view of a side rail riveted to a hinged arm along section line 1b—1b according to FIG. 1a;

DESCRIPTION OF INVENTION AND PREFERRED EMBODIMENT

Figure 1:
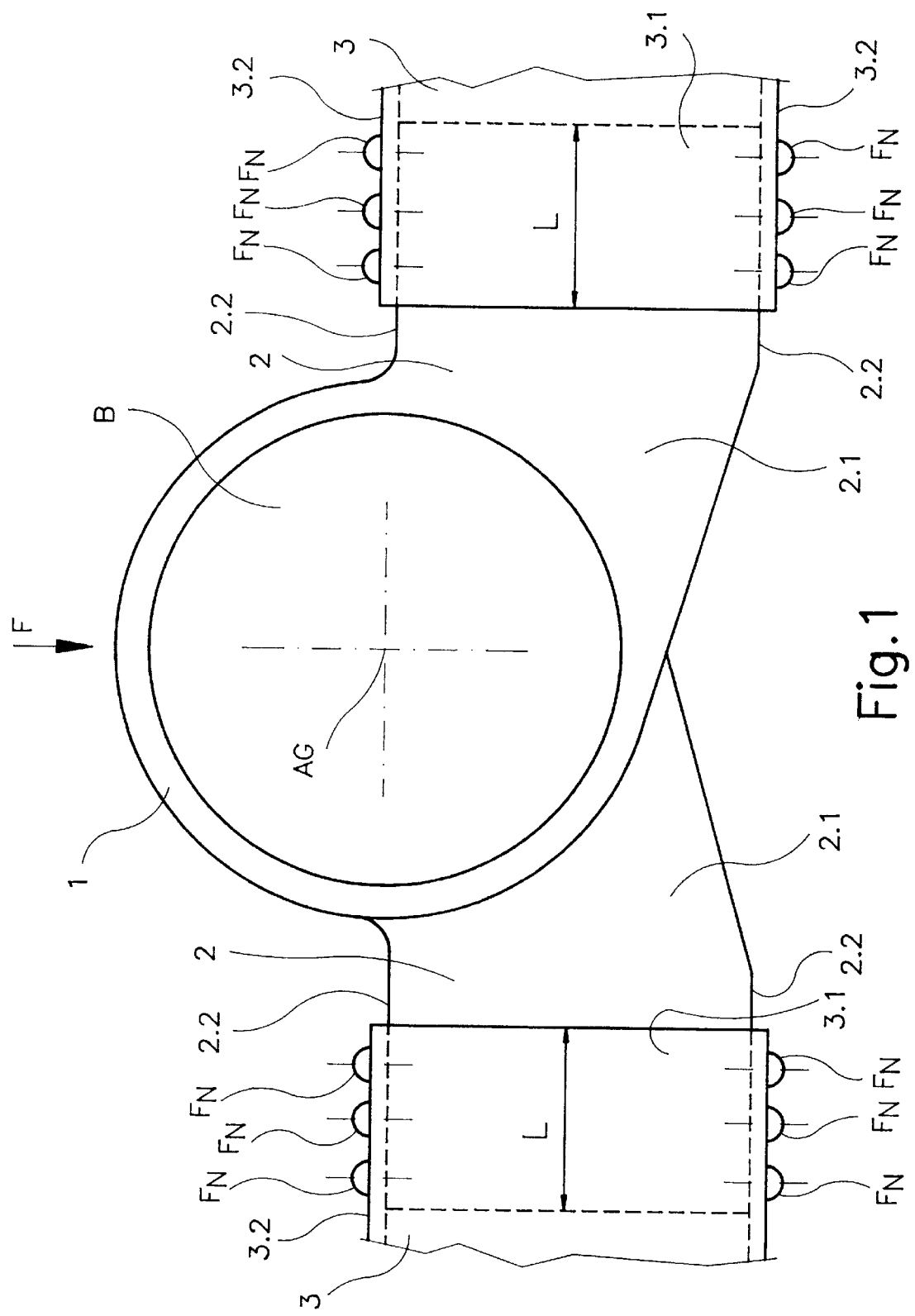
FIG. 1 is a front elevational view of a ladder hinge in a stretched position with ladder side rails attached to hinged arms.

The present invention provides for a connection of a ladder side rail to a ladder hinge. A ladder side rail 3 and a hinged arm 2 of a ladder hinge 1 overlap in a region L. Joining connections are disposed in the region L. Form-matching and/or force-matching joining connections $F_N$, $F_u$ are connecting a profile of the hinged arm 2 and a profile of the ladder side rail 3 in an area of respective sides of the ladder side rail 3.2 and of the hinged arm 2.2. The respective sides of the ladder side rail 3.2 and of the hinged arm 2.2 are substantially disposed parallel to a hinge axis AG of the ladder hinge.

The area of the respective sides of the ladder side rail 3.2 and of the hinged arm 2.2 can be furnished by a corner region 6 of the ladder side rail 3 and by a corner region 5 of the hinged arm 2.

The area of respective sides of the ladder side rail 3.2 and of the hinged arm 2.2 can be disposed substantially parallel to the hinge axis AG of the ladder hinge.

The joining connections $F_u$ can be formed as a connection produced by deformation. Formed material of the ladder side rails 3 can be entered in recesses 4 in the hinged arm 2.

The recesses 4, provided in the hinged arms 2, and the joining connection $F_u$, generated by deformation, can exhibit in a top planar view a substantially rectangular or circular shape.

The joining connection $F_u$ can be formed in each case as a stamping, as a taper, as a butt joint, as a corner butt joint, as a dovetail half-tap joint, in the form of a rail head, as a crimp connection, by a bending joining connection or, respectively, by an interstratified joining connection.

At least one joining connection $F_u$, produced by deformation, can be disposed in each corner region 5, 6 of the profile of the hinged arm 2 and of the ladder side rail 3.

Several joining connections $F_N$, $F_u$ can be disposed in series in a longitudinal direction of the ladder side rail 3.

The hinged arm 2 can be employed in the shape of a lamella 8. An H-shaped incision can be furnished in the lamella 8 of the hinged arm 2. Flaps 9, formed by the incision, can be bent in a direction toward an oppositely disposed side of the ladder side rail 3 such that the flaps 9 rest with their outer edges in corners of the ladder side rail 3. Recesses 4 can be provided in the flaps 9 at the edges, which edges are disposed in the corners of the ladder side rail 3, and at the corner regions 5 of the lamella 8.

Figure 1A:
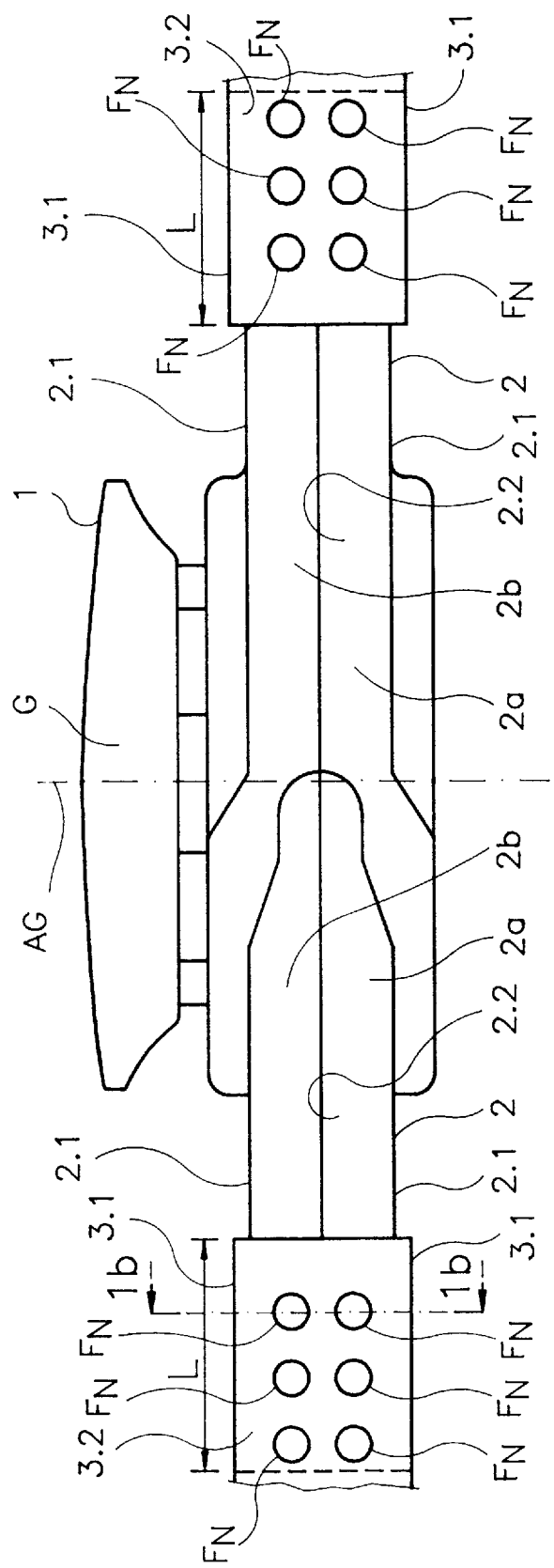
FIG. 1a is a top planar view onto the ladder hinge according to FIG. 1.
Figure 1B:
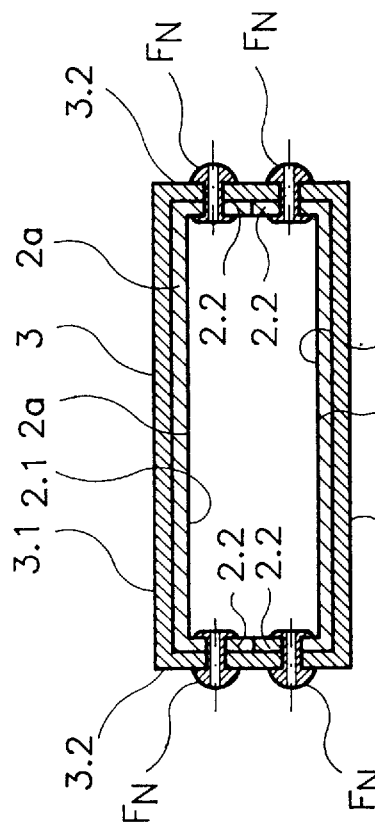
Figure 2:
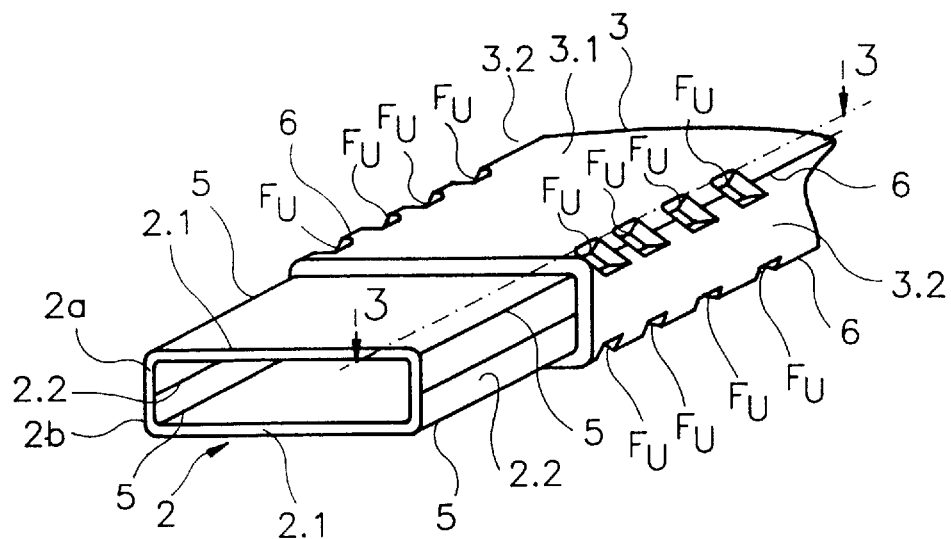
FIG. 2 is a perspective view of a connection, produced by deformation, wherein the joining positions are disposed in the corner regions of the profiles.

The ladder hinge 1 exhibits according to FIGS. 1 and 2 hinged arms 2, wherein each hinged arm 2 is formed by two U-shaped profiles 2a and 2b (FIG. 1a). The two hinged arms 2 can be swivelled around a common axis AG. The ladder hinge 1 exhibits an actuation element G (FIG. 1a) for actuation. Each hinged arm 2 is slid into the end of a ladder side rail 3 such that the hinged arm 2 and the ladder side rail 3 overlap by a length L (FIG. 1). The joining connection between the hinged arm 2 and the ladder side rail 3 is performed in the shape of rivet connections $F_N$, wherein these rivet connections are not resting at the longer and wider profile sides 2.1 and 3.1, which are disposed perpendicular to the hinge axis AG, but rather at the short and narrow profile sides 2.2 and 3.2. According to this embodiment, two rows of three rivet connections $F_N$ in series aligned with the longitudinal direction of the ladder side rail 3 are in each case disposed at four side locations, with two side locations associated with each hinged arm, and wherein the two side locations of each hinged arm are disposed on two opposite narrow sides of the side rail, as can be seen in FIG. 1a as pairs at each profile side 2.2 and 3.2. It can be recognized from the sectional view along section line 1b—1b of FIG. 1a shown in FIG. 1b that the profile sides 2.2 of the hinged arms 2 are in each case formed from the short sides of the U profiles 2a and 2b. These rivet connections $F_N$ are formed by blind rivets.

According to the invention there exists the additional possibility to form the joining connection in the kind of a connection $F_V$, produced by deformation. In this case, openings 4 (FIG. 3) are provided at the predetermined connection positions in the hinged arms 2 of the ladder hinge 1, wherein the material of the respective ladder side rail 3 is formed into the openings 4 based on a suitable deformation process. Advantageously in this case a stamping method is employed, wherein the material of the ladder side rail 3 is formed into the openings 4 of the hinged arm 2 with an in particular rectangular or circular die pushed by a press or stamping die. A suitable deformation method is, for example, also the interstratified joining, the butt joint, the corner butt joint, the dovetail half-tap joint, the rail stripping connection, or the crimp connection, the pressing connection, the squeezing connection.

According to FIG. 2, the joining connection $F_u$, produced by deformation, are furnished at the corner positions 5 of the profiles of the hinged arms 2 and thus at the corner positions 6 of the ladder side rails 3 in the region L of the overlap. According to the embodiment illustrated in FIG. 2, four joining connections $F_u$ are furnished, in each case disposed in series in the longitudinal direction of the ladder side rail 3, in each corner region 5 and 6. These joining connections $F_u$, produced by deformation, are generated by stamping the material of the ladder side rail 3 into corresponding openings 4 in the corner regions 5 of the hinged arm 2. Four stampings in the region of the openings 4 are present in each corner region of the ladder side rails 3.

Figure 3:
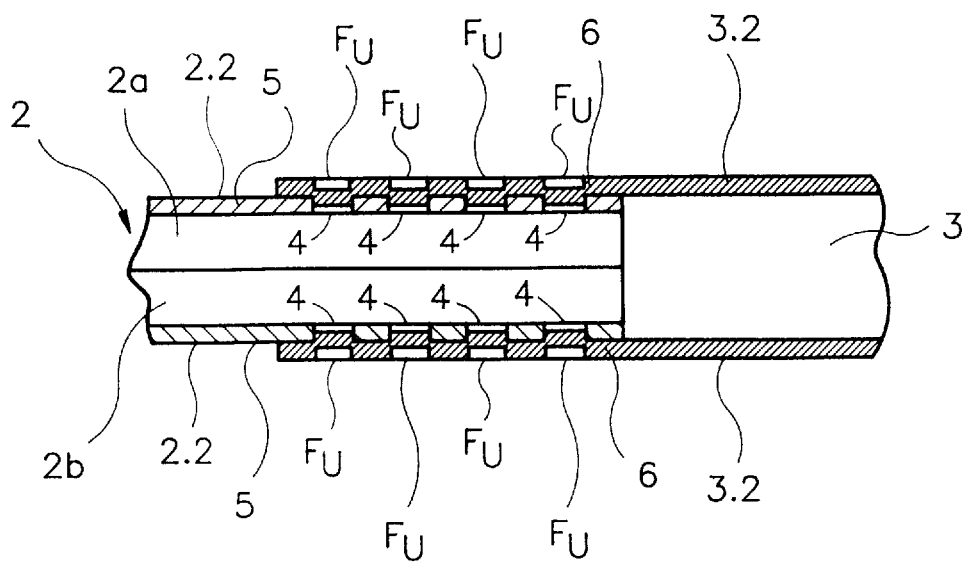
FIG. 3 is a sectional view of the embodiment according to FIG. 2, along section line 1b—1b of FIG. 2.

A sectional view through the joining connections $F_u$, produced by way of stamping, is illustrated in FIG. 3. One recognizes in this connection how the material of the ladder side rail 3 is formed in the openings 4 in the corner regions 5 of the hinged arm 2. The number of the in-series disposed joining connections $F_u$ can be varied correspondingly. Furthermore, the possibility exists also to dispose these connections $F_u$, like the rivet connections $F_N$, not in the corner regions 5, 6, but rather to enter them into the profile sides 2.2 and 2.3.

Figure 4:
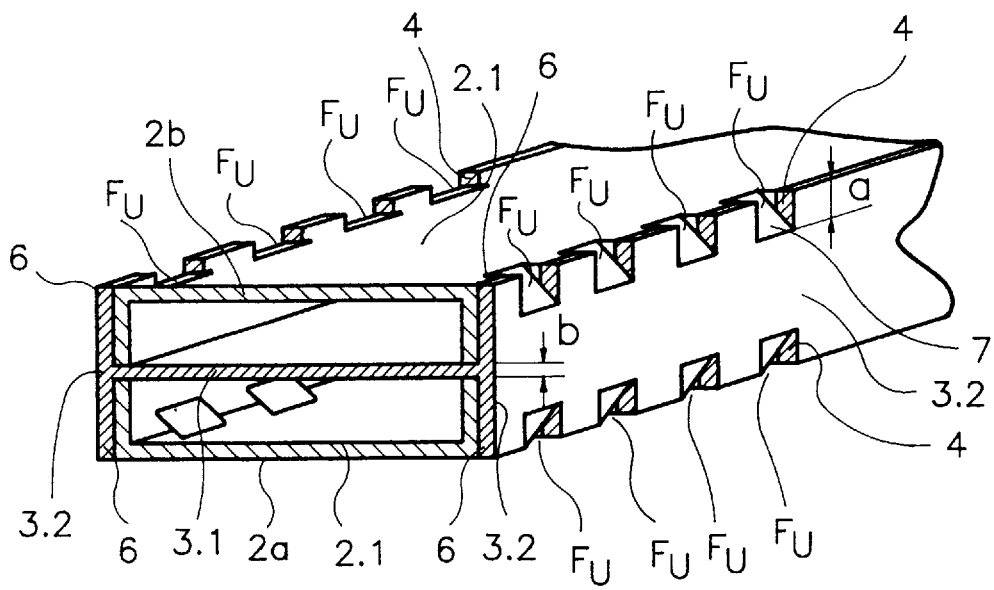
FIG. 4 is a view of a joining connection employing a T-shaped ladder profile.

Based on the novel arrangement according to the invention of the joining connection $F_u$, produced by deformation, in the corner positions 5 and 6, according to FIG. 4, the ladder side rail 3 can also be formed in the shape of a double-T profile with two parallel profile sides 3.2 and a profile side 3.1, disposed between the profile sides 3.2 and aligned perpendicular to the profile sides 3.2. The hinged arms 2 of the ladder hinge 1 exhibit a distance b, where distance b corresponds to the profile thickness of the profile side 3.1, shown in the drawing in a horizontal position, of the ladder side rail 3. The material of the vertical profile sides 3.2 of the ladder side rail 3 is in each case formed into the openings 4 at the outer edges (corner positions 6) in the region of the openings 4 disposed in the hinged arm 2.

Figure 4A:
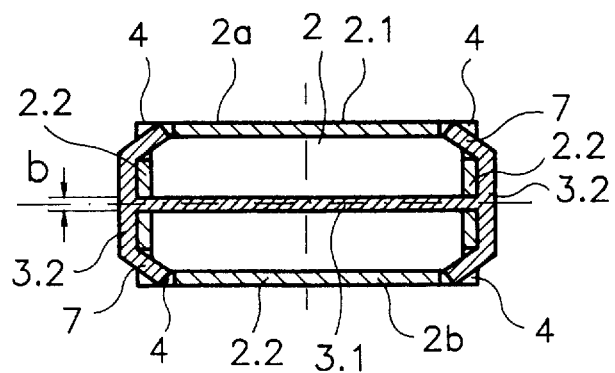
FIG. 4a is a cross-sectional view of the joining connections of FIG. 4.

A cross-section of these joining connections $F_u$ is illustrated in FIG. 4a. For this purpose, the corner sides 6 of the profile sides 3.2 of the ladder side rail 3 are separated along certain sections over a length a and the thereby generated brackets 7 are bent into the openings 4.

In addition to the double-T profiles, U profiles or other related profiles can be employed for the ladder side rail.

Figure 5:
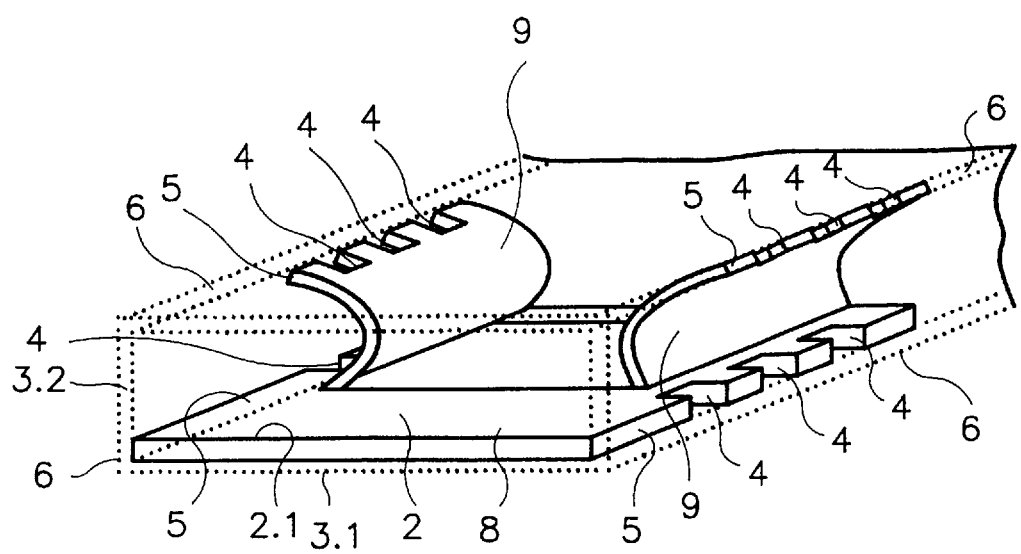
FIG. 5 is a view of a joining connection at a hinged arm in the shape of a lamella.

It is also possible to employ a hinged arm 2 in the shape of a lamella 8, as illustrated in FIG. 5, instead of the hinged arms 2 made from in each case two U profiles. This lamella is disposed with its profile side 2.1 on a profile side 3.1 of the ladder side rail 3. In order to allow the attachment through a joining connection $F_u$, produced by deformation, in the four corner positions 6 of the ladder side rail 3, an H-shaped incision is entered into the profile side 2.1 of the lamella 8. The thereby generated flaps 9 are bent in a direction toward the opposite side 3.1 of the ladder side rail 3. Openings 4 had previously been provided at the longitudinal sides in the lamella 8. Furthermore, openings 4 were also provided in the flaps 9, such that openings 4 are present in each corner region 6 of the ladder side rail 3 in the predetermined joining connections $F_u$. As already described above, the material from the corner regions 6 of the ladder side rail 3 is then formed in the openings 4 based on a suitable deformation process. Thus, the structure of FIG. 5 mimics the embodiment of FIG. 2, but employs only a flat rail and not a rectangular tube.

The hinged arms 2 can also be slid over the ladder side rails as an equivalent method relative to the exemplified embodiments. The openings 4 are present in the ladder side rail 3 and the material of hinged arm 2 is formed into the openings 4 of the ladder side rail 3 upon the production of the joining connection $F_u$ by deformation.

Geometrically, the structures generated can be described as follows. A ladder with steps frequently includes a hinge having a hinge axis disposed parallel to the elongation direction of the steps. The side rails are essentially parallelepipedal bodies or rectangular parallelepipedal bodies. The longest dimension of the paralellepiped presents the height or length of the ladder. The smallest dimension of the parallelepiped is represented by a plane spanned by two straight lines, where one of the two straight lines is disposed parallel to the hinge axis. The medium dimension is represented by a plane disposed substantially perpendicular to the axis of the hinge. According to the present invention, the arm of the hinge and the side rail are attached to each other in overlapping areas of the medium dimension of the side rail and of the hinged arm. The connection can be performed by rivets attaching the hinged arm to the side of the medium dimension of the side rail. Alternatively, the edges between the side of the medium dimension and the side of the smallest dimension can be used to force-attach the side rail to the hinged arm.

The novel arrangement of the joining connections $F_N$ and $F_u$, assures an optimum force transfer from the ladder side rail 3 to the hinged arm 2, since the joining connections $F_N$ and $F_u$, are disposed in the profile sides 2.2 and 3.2 of the ladder side rails 3 and the hinged arms 2, onto which the torque, generated in case of force action, and acts mostly by tension forces and compression forces. The forces are therefore transferred in an optimum way from the ladder side rail 3 to the hinged arm 2. It becomes possible in this way to minimize the length L of the overlap of the ladder side rail 3 and of the hinged arm 2. A deformation of the ends of the ladder side rail 3, which ends are connected to the hinged arms 2, is nearly excluded. In particular, based on the production of the joining connections $F_u$, with a suitable deformation process, there is created a simple, economically favorable, and at the same time reliable connection. Additional connection elements are no longer required to provide the connection.

It will be understood that each of the elements described above, or two or more together, may also find a useful application in other types of coupling connections differing from the types described above.

While the invention has been illustrated and described as embodied in the context of a connection between a ladder side rail and a hinged arm of a ladder hinge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A connection between a ladder side rail and a hinged arm of a ladder hinge comprising
   a ladder hinge having an axis;
   a ladder side rail having a tubular structure and a substantially rectangular cross-section and exhibiting four longitudinal edges;

a hinged arm of the ladder hinge having a substantially rectangular cross-section and exhibiting four edges and at least one recess in one of the longitudinal edges of the hinged arm, wherein a free end section of the hinged arm and an upper end section of the ladder side rail overlap in a predetermined section;

a junction between the ladder side rail and the hinged arm disposed in the predetermined section and connecting a rectangular profile of the hinged arm and a rectangular profile of the ladder side rail in the predetermined section of the ladder side rail and of the hinged arm, wherein at least one joining connection, produced by deformation of material of the ladder side rail at one of its edges into said one recess, is disposed in one of said longitudinal edges of the rectangular profile of the hinged arm and of the ladder side rail.

2. The connection between a ladder side rail and a hinged arm of a ladder hinge according to claim 1, wherein the rectangular profile of the hinged arm and the rectangular profile of the ladder side rail exhibit matching forms for fittingly engaging each other, and wherein the connection between the hinged arm and the ladder side rail is furnished at the longitudinal edges of the respective rectangular profiles, and wherein the longitudinal edges correspond to the corners of the rectangular cross-section.

3. The connection between a ladder side rail and a hinged arm of a ladder hinge according to claim 1, wherein the hinged arm is furnished with recesses disposed along the four longitudinal edges of the hinged arm in the overlapping section, wherein formed material of the ladder side rail is entered in the recesses in the hinged arm, and wherein the joining connections are formed as connections produced by deformation.

4. The connection between a ladder side rail and a hinged arm of a ladder hinge according to claim 3 wherein the recesses, provided in the hinged arm, and the joining connection, generated by deformation and recess along the four longitudinal edges of the ladder side rail in the overlapping region, exhibit in a top planar view a shape exhibiting substantially an axial symmetry.

5. The connection between a ladder side rail and a hinged arm of a ladder hinge according to claim 4, wherein the recesses, provided in the hinged arm, and the joining connection, generated by deformation, exhibit in a top planar view a substantially circular shape.

6. The connection between a ladder side rail and a hinged arm of a ladder hinge according to claim 4, wherein the recesses, provided in the hinged arm, and the joining connection, generated by deformation, exhibit in a top planar view a substantially rectangular shape.

7. The connection between a ladder side rail and a hinged arm of a ladder hinge according to claim 1, wherein the joining connection is formed from a stamping.

8. The connection between a ladder side rail and hinged arm of a ladder hinge according to claim 1, wherein a plurality of the joining connection is disposed in series in a longitudinal direction of the ladder side rail.

9. The connection between a ladder side rail and a hinged arm of a ladder hinge according to claim 1, wherein the joining connection is formed from a crimp connection.

10. The connection between a ladder side rail and a hinged arm of a ladder hinge according to claim 1, wherein the joining connection is formed from a bending joining connection.

11. A connection between a ladder side rail and hinged arm of a ladder hinge comprising a ladder hinge having an axis;

a ladder side rail having a tubular structure and a substantially rectangular cross-section and exhibiting four longitudinal edges;

a hinged arm of the ladder hinge employed in the shape of a lamella, wherein a free end section of the hinged arm and an upper end section of the ladder side rail overlap in a predetermined section, and wherein an H-shaped incision is furnished in the lamella of the hinged arm, and wherein flaps, formed by the incision, are bent in a direction toward an oppositely disposed side of the ladder side rail such that the flaps rest with their outer longitudinal edges in inner longitudinal edges of the ladder side rail, wherein recesses are provided in the flaps; at longitudinal edges;

a junction between the ladder side rail and the hinged arm disposed in the predetermined section and connecting the flaps of the hinged arm and a rectangular profile of the ladder side rail in the predetermined section of the ladder side rail and of the hinged arm, wherein at least one joining connection, produced by deformation of material of the ladder side rail at one of its edges into said one recess, is disposed in one of said longitudinal edges of the flaps of the hinged arm and of the ladder side rail;

and wherein said recesses receive the material of the ladder side rail.

* * * * *